(No Model.)
S. J. ANDERSON.
DISH WASHING MACHINE.
No. 254,898.            Patented Mar. 14, 1882.
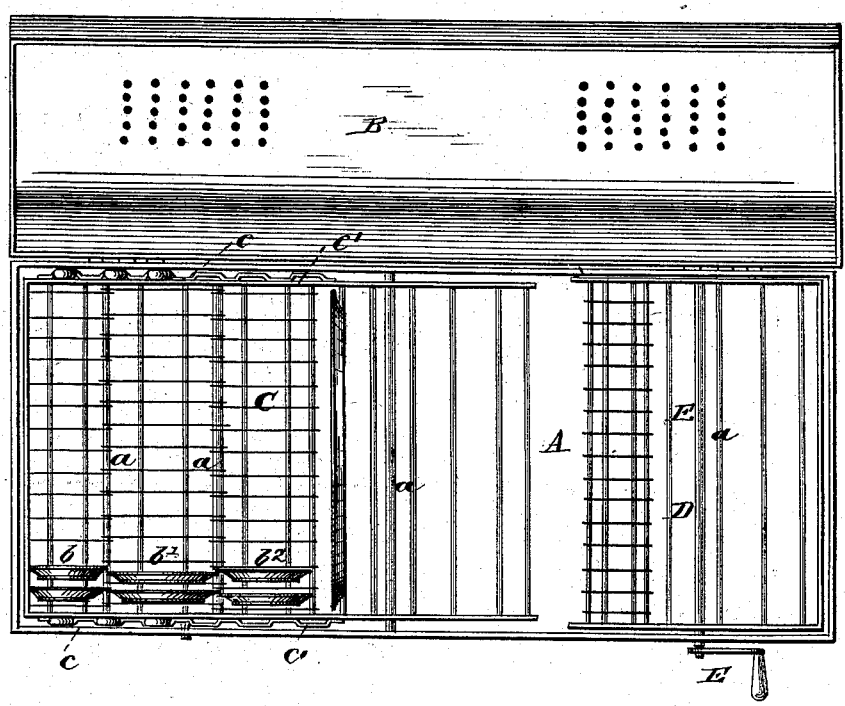
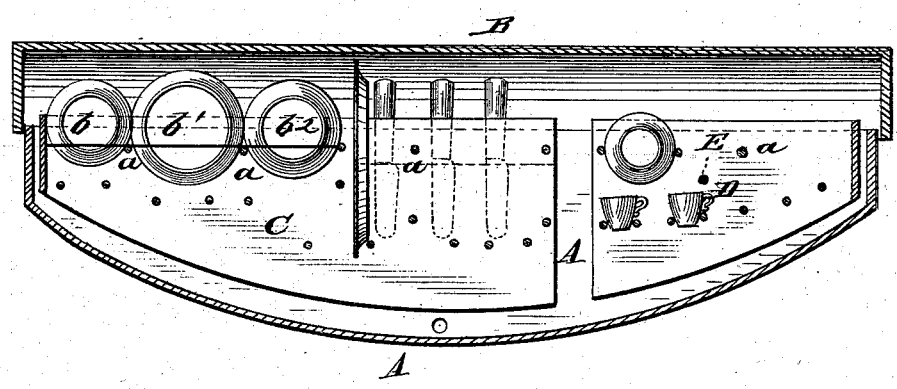
WITNESSES
Sallie J. Anderson
INVENTOR,
by Louis Bagger & Co.
Attorneys

UNITED STATES PATENT OFFICE.

SALLIE J. ANDERSON, OF BARTLETT, TENNESSEE.

DISH-WASHING MACHINE.

SPECIFICATION forming part of Letters Patent No. 254,898, dated March 14, 1882.

Application filed December 9, 1881. (No model.)

*To all whom it may concern:*

Be it known that I, SALLIE J. ANDERSON, of Bartlett, in the county of Shelby and State of Tennessee, have invented certain new and useful Improvements in Dish-Washing Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view, with the cover swung back, of my improved dish-washer, and Fig. 2 is a longitudinal section of the same.

This invention relates to improvements in dish-washers, having for its object to effect the thorough washing or cleaning and, after cleaning, the drying or removal of refuse water from the dishes or the cutlery; and it consists in the detailed construction and combination of parts hereinafter fully described, and particularly pointed out in the claim.

In the accompanying drawings, A is a vessel or pan, preferably convex on its lower side, and having a waste-water faucet to run the refuse water off as fast as used to avoid the collection of crumbs, &c., in the water, and thus avoid their adhering to the articles being washed. The vessel is supplied with a cover or lid, B, which serves to inclose the articles, and thus enable the pan to act as a safe or receptacle to hold them when in a clean state.

C is a rack, supported or hung in the pan A by rods $a$, or other suitable means, and adapted, as at $b$, to hold small or tea plates, at $b'$ to hold dinner-plates, at $b^2$ to hold breakfast-plates, and at $c\ c'$ to hold knives and forks.

D is a tilting rack, having means to enable it to hold cups and saucers and other deep dishes. It is provided with a lever or adjusting mechanism, E, to permit it to be rocked or agitated to more thoroughly effect the cleansing of the deep dishes contained within it.

The operation of washing is as follows: Hot water from a kettle or other heating-vessel is poured over the articles, contact with which effects the thorough cleaning or washing of the same, while the faucet is kept open to run off as fast as removed from the articles the refuse particles of food or victuals. The water being drawn or run off from the pan leaves the articles in a condition to readily dry from the heat produced by the contact of the hot water therewith, and thus they do not require wiping or the use of a dish-rag, the odor from which is exceedingly disagreeable.

If desired, brushes may be arranged and properly disposed in the pan or racks to aid the cleaning of the articles.

Having thus fully described my invention, I claim and desire to secure by Letters Patent—

In a dish-washer, the combination of the pan or vessel A, provided with the rack C, and tilting rack D, having a crank-shaft, E, for rocking or tilting it from the outside within the pan A independent of the stationary rack C, as shown and set forth.

In testimony that I claim the foregoing as my own I have hereunto affixed my signature in presence of two witnesses.

SALLIE JANE ANDERSON.

Witnesses:
 KATE PRYOR,
 CYNTHIA BRADLEY.